United States Patent [19]
Blakesley et al.

[11] Patent Number: 5,477,755
[45] Date of Patent: Dec. 26, 1995

[54] UNIVERSAL CUTTING BLADE BLANK AND METHOD FOR FORMING A CUTTING BLADE THEREFROM

[75] Inventors: Richard C. Blakesley, Holcomb; Richard L. Kitchen, East Rochester, both of N.Y.

[73] Assignee: The Gleason Works, Rochester, N.Y.

[21] Appl. No.: 278,672

[22] Filed: Jun. 27, 1994

Related U.S. Application Data

[63] Continuation of Ser. No. 36,312, Mar. 24, 1993, abandoned.

[51] Int. Cl.$^6$ .............................. B23F 21/12; B23F 21/22
[52] U.S. Cl. ........................................ 76/101.1; 407/115
[58] Field of Search ............................. 407/22, 115, 116; 76/101.1

[56] References Cited

U.S. PATENT DOCUMENTS

| | | | |
|---|---|---|---|
| 4,144,678 | 3/1979 | Ellwanger et al. | 51/288 |
| 4,260,299 | 4/1981 | Ryan et al. | 407/115 |
| 4,272,927 | 6/1981 | Myers et al. | |
| 4,575,285 | 3/1986 | Blakesley | 407/115 |
| 4,621,954 | 11/1986 | Kitchen et al. | 407/22 |
| 4,981,402 | 1/1991 | Krenzer et al. | 409/26 |
| 5,168,661 | 12/1992 | Pedersen et al. | 51/285 |

FOREIGN PATENT DOCUMENTS

| | | |
|---|---|---|
| 0264642 | 4/1988 | European Pat. Off. . |
| 1505694 | 9/1989 | U.S.S.R. . |

OTHER PUBLICATIONS

Borisov, M. A. et al., "Synthesis of Generating Surfaces Of Gear–Cutting Heads", *Russian Engineering Research*, vol. 12, No. 4, Allerton Press Inc., New York, 1992.

*Primary Examiner*—Douglas D. Watts
*Attorney, Agent, or Firm*—Robert L. McDowell; Ralph E. Harper

[57] ABSTRACT

A universal cutting blade blank and cutting blades formed therefrom. The front face of the blank and blade comprises a pair of mounting surfaces with a front rake surface and connecting surface located therebetween. The cutting blade formed from the blade blank is more stable in a cutter head during cutting operations such as in the production of gears and related toothed articles. A single cutting blade blank can be used for forming inside and outside cutting blades regardless of the direction of cutter rotation.

13 Claims, 8 Drawing Sheets

FIG. 17 ized to sharpen the cutting blade while preserving the front surface of the
UNIVERSAL CUTTING BLADE BLANK AND METHOD FOR FORMING A CUTTING BLADE THEREFROM This is a continuation of application Ser. No. 08/036,312, filed on Mar. 24, 1993 now abandoned.

FIELD OF THE INVENTION

The present invention is directed to cutting blades for cutting gears and related toothed articles. Particularly, the present invention relates to cutting blade blanks formed from a length of bar stock and cutting blades formed therefrom.

BACKGROUND OF THE INVENTION

In the production of gears and related toothed articles, one type of cutting blade commonly utilized is a blade known as a stick-type cutting blade made from a length of bar stock material such as M2 high speed steel. A plurality of such blades are secured in a cutter head mounted on a cutter axis of a gear cutting machine and are advanced into contact with a gear blank to form tooth profiles into the blank. Gear cutting machines utilizing such cutting blades are known in the art, as shown, for example, in U.S. Pat. No. 4,981,402 to Krenzer et al.

One form of a stick-type cutting blade is designed so that only the top surface and side surfaces (pressure side and clearance side) require grinding in order to sharpen the cutting blade while preserving the front surface of the blades. These cutting blades are known as "profile-sharpened" cutting blades. Profile-sharpened cutting blades are such that the length of each blade is reduced by each sharpening and for this reason the blades are provided with a front cutting surface length whereby the blades may be axially advanced in a cutter head slot as needed in order to provide adequate stock for restoring the surface profiles. Examples of such cutting blades can be seen in U.S. Pat. No. 4,260,299 to Ryan et al., U.S. Pat. No. 4,621,954 to Kitchen et al., and U.S. Pat. No. 4,575,285 to Blakesley.

Cutting blades such as those illustrated in the above-referenced patents comprise two sections, a base portion and a cutting end portion. The base portion is generally of a rectangular cross-section. The cutting end portion, however, includes a rake face extending nearly side-to-side across the front of the blade and oriented at a particular rake angle to produce relief away from the cutting edge. Due to this configuration, a blade may be utilized, for example, for cutting inside (convex) gear tooth flanks with a right-handed cutter (counter-clockwise cutter rotation) or for cutting outside (concave) gear tooth flanks with a left-handed cutter (clockwise cutter rotation). However, for cutting outside gear tooth flanks with a right-handed cutter or inside gear tooth flanks with a left-handed cutter, a "mirror-image" cutting blade is necessary, such a blade having a cutting edge on the opposite side of its front face and having a rake face extending in an opposite manner across the front face when compared to the cutting blade described above.

When the cutting blade is initially mounted in the slot of a cutter head, both the base portion and the cutting end portion are positioned in the slot of the cutter head with only enough of the cutting end portion extending beyond the cutter head surface as is needed to machine the desired workpiece. Excess blade length beyond the cutter head surface contributes to cutter instability. Even after the cutting blade is sharpened and it becomes necessary to axially reposition the blade in the slot due to its reduced length from the sharpening process, a part of the cutting end portion remains in the slot. Although the base portion of the cutting blade is fully supported in the cutter head, the cutting end portion which is located in the cutter head slot is not completely supported because of the portion of the blade body removed by the formation of the rake face of the cutting blade.

When axial advance of the blade in the slot reaches a point where only the base portion of the blade remains in the slot, that is, when axial advancement results in that part of the base portion adjacent the rake surface becoming essentially flush with the surface of the cutter head, the cutting blade will then be fully supported. However, this point in the axial advancement of the blade signifies the end of the useful length of the cutting blade since there is usually an inadequate amount of rake surface remaining on the front surface of the blade to permit another sharpening of the blade.

Consequently, during cutting of a workpiece, while the base portion allows for support at all four corners due to its rectangular cross-section, that portion of the cutting blade which is not supported at all four corners (the cutting end portion) in the cutter head slot, while being stable in many cutting applications, has a tendency to twist under conditions where the loads and stresses of cutting are high, such as when large amounts of stock material are removed by each pass of a cutting blade through the tooth slot of a workpiece. Twisting of the cutting blades effectively repositions the cutting edges of the blades and leads to unacceptable tooth flank surfaces being formed. Except for the final stage of the useful life of the cutting blade, the potential unstable condition due to the lack of complete support of the blade exists at all times during cutter operation.

In the above-cited U.S. Pat. No. 4,621,954, narrow portions on either side of the back surface of a cutting blade are included to provide clearance between a pair of cutting blades positioned in a single slot. However, the inclusion of these narrow portions on the back surface in no way influences the front face of the cutting end portion of the blade. There continues to be a lack of complete support of the portion of the blade removed by the formation of the rake surface.

Accordingly, it is an object of the present invention to provide a universal cutting blade blank having a front rake face and which is capable of being formed into a cutting blade regardless of tooth surface to be cut or direction of cutter rotation.

It is another object of the present invention to provide a cutting blade with mounting surfaces which will prevent twisting in the cutter head during cutting operations even though the cutting blade is provided a front rake face throughout its length.

SUMMARY OF THE INVENTION

The present invention comprises a cutting blade blank and a cutting blade formed therefrom.

The cutting blade blank of generally rectangular cross-section comprises opposite end surfaces, a pair of opposed side surfaces, a back surface, and a front surface with the front surface including a pair of mounting surfaces, a front rake surface, and a connecting surface. The front rake surface and the connecting surface are located between the mounting surfaces.

The front rake surface extends from one of the pair of mounting surfaces and is oriented at a rake angle with respect thereto. The connecting surface extends from the other of the pair of mounting surfaces to the rake surface and intersects therewith.

The present invention also includes a cutting blade formed from a blade blank as set forth above. The cutting blade includes a pressure side surface, a clearance side surface, and a top surface.

The pressure side surface is oriented at a predetermined pressure angle with respect a side surface and a cutting edge is defined by the intersection of the pressure side surface and the front surface.

The clearance side surface is oriented at a predetermined clearance angle with respect to a side surface and a clearance edge is defined by the intersection of the clearance side surface and the front surface.

DETAILED DESCRIPTION OF THE PREFERRED EMBODIMENTS

The preferred embodiments of the present invention will be discussed with reference to the accompanying Drawings. It is to be understood that throughout the Drawings, like reference numbers are utilized for referencing like components.

Figure 1:
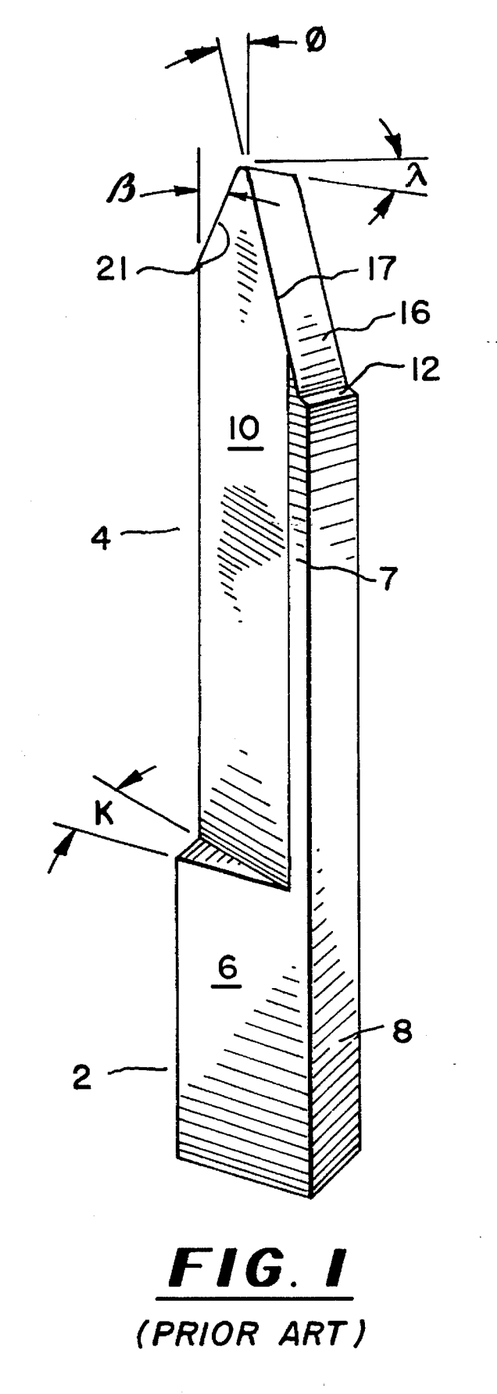
FIGS. 1 and 2 illustrate, respectively, an isometric view and a top view of a prior art type of cutting blade.
Figure 2:
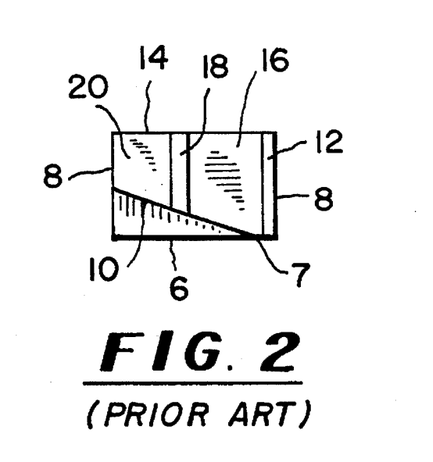

FIGS. 1 and 2 illustrate one type of conventional profile-sharpened stick-type cutting blade formed from a length of bar stock material. This cutting blade comprises a base portion 2 and a cutting end portion 4. The base portion 2 includes a front face 6. Side surfaces 8 and back surface 14 extend the length of the cutting blade.

Cutting end portion 4 comprises a narrow front surface 7, which is an extension of base front face 6, rake face 10 oriented at a particular rake angle K, shoulder 12, pressure side surface 16, top surface 18 and clearance side surface 20. Cutting edge 17 is defined by the intersection of pressure side surface 16 and rake face 10 while clearance edge 21 is defined by the intersection of clearance side surface 20 and rake face 10. Top surface 18 is relieved from front to back as shown by angle λ, cutting edge 17 is oriented at pressure angle φ with respect to side 8 and clearance edge 21 is oriented at clearance angle β with respect to side 8.

Figure 3:
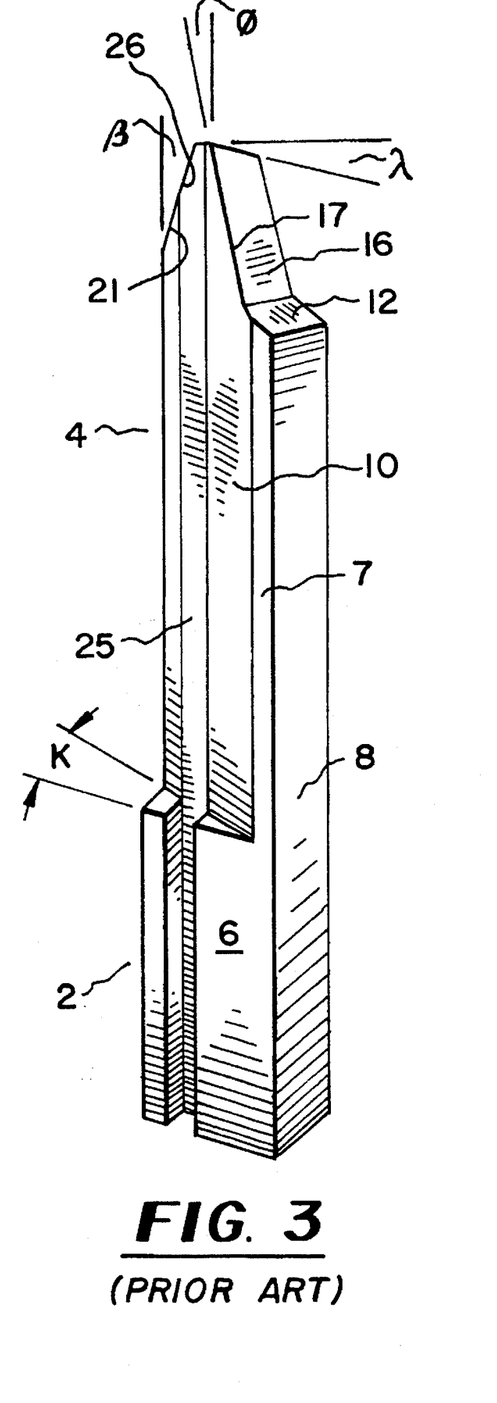
FIGS. 3 and 4 illustrate, respectively, an isometric view and a top view of another type of prior art cutting blade.
Figure 4:
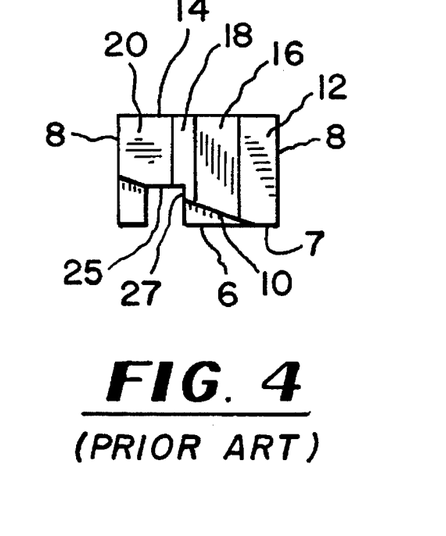

FIGS. 3 and 4 show another type of conventional profile-sharpened cutting blade. While most of the features of this type of cutting blade are similar to those of the cutting blade shown in FIGS. 1 and 2, the cutting blade of FIGS. 3 and 4 further includes a second surface 25 formed by a slot extending the length of the blade. The second surface 25 is oriented at an angle different from the rake angle K. At its intersection with clearance side 20, second surface 25 forms a secondary cutting edge 26 which is utilized to cut a portion of the bottom of a tooth slot as well as a portion of the tooth flank opposite the flank being cut by cutting edge 17. A chip breaking surface 27 is formed between surfaces 10 and 25.

Figure 5:
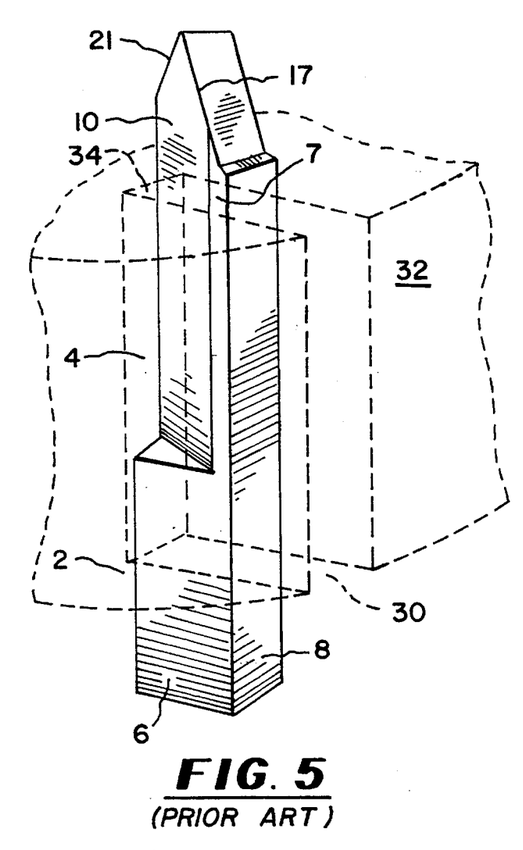
FIG. 5 depicts a prior art cutting blade positioned in a slot of a cutter head.
Figure 6:
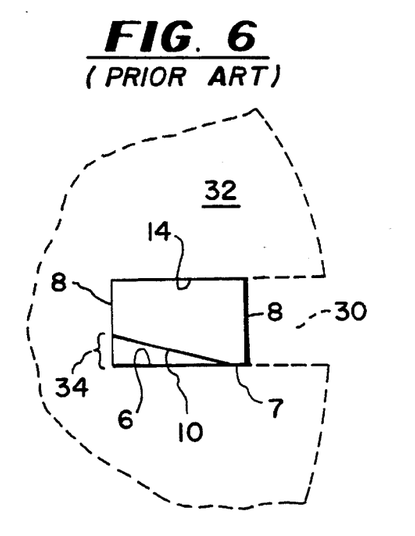
FIG. 6 illustrates the cutting blade of FIG. 5 in the cutter head slot as viewed from the surface of the cutter head.

FIGS. 5 and 6 show a cutting blade as shown in FIG. 1 positioned in a slot 30 of a cutter head 32. It can be seen that parts of the base portion 4 and cutting end portion 2 are located in the slot 30. Even when the cutting blade is sharpened causing a reduction in length and therefore requiring axial repositioning in the slot 30, parts of the base portion 2 and cutting end portion 4 will be present in the slot.

Looking at FIG. 6, which is a view into the slot 30 from the surface of the cutter head 32, it is seen that although the rectangular base portion 2 is completely supported on all sides in the slot 30, the cutting end portion is not supported along the rake face 10. It is to be noted that a clamping block (not shown) or similar structure would abut against the outer side of the cutting blade to hold it in position in the slot 30. Such a clamping device is well known in the art and therefore, for clarity purposes, has not been illustrated. The formation of rake surface 10 across much of the front of the cutting blade has eliminated the front, clearance-side corner of the cutting blade thus creating a gap 34 between the cutting blade and the surface of the slot 30. It can be clearly seen that a gap would also exist with the cutting blade of FIG. 3 when positioned in a cutter head.

Applicants have discovered that conventional cutting blades such as those shown in FIGS. 1 through 6 exhibit a tendency to twist in the cutter head slot under certain operating conditions. The effect of the twisting is a shifting of the cutting edge of the blade resulting in incorrect tooth surfaces being formed on the workpiece. The twisting is believed to be due to a lack of adequate support for the cutting end portion at the front, clearance-side region of the blade where the rake face 10 intersects the side 8 of the cutting blade. Since there is no stock material in this region of the cutting blade, the blade is not fully supported against the surface of the cutting head slot. In other words, the gap 34, as shown in FIG. 6, permits the cutting end portion to twist during some cutting operations.

The present invention is directed to a cutting blade blank and cutting blade formed therefrom wherein twisting in the cutter head slot is eliminated. This novel cutting blade blank also has the advantage over the prior art in that a single blade blank can be utilized to produce cutting blades for inside or outside tooth surfaces regardless of the direction of cutter rotation.

Figures 7, 8:
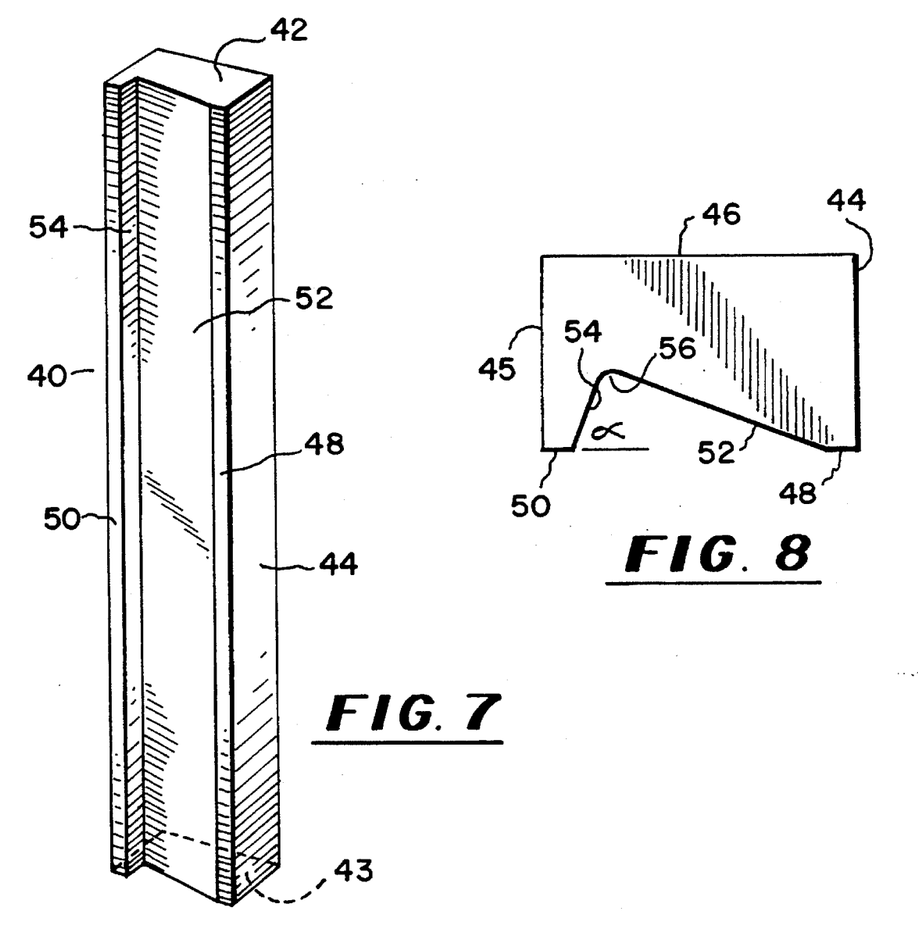
FIG. 7 shows a cutting blade blank in accordance with the present invention.
FIG. 8 illustrates a cross-sectional view of the cutting blade blank of FIG. 7.

A cutting blade blank in accordance with the present invention is shown in FIGS. 7 and 8. The blade blank 40 has no separate base and cutting end portions as in the prior art. Instead, blade blank 40, formed from a length of bar stock material such as M2 high speed steel, has a uniform cross-section along its entire length. Blade blank 40 comprises end surfaces 42 and 43, back surface 46, and a pair of opposing side surfaces identified as a first mounting surface 44 and second mounting surface 45. The front surface of blade blank 40 includes a pair of mounting surfaces 48 and 50, rake surface 52 and connecting surface 54. Rake surface 52 and connecting surface 54 are in the general form of a groove extending the length of the cutting blade blank. Preferably, a radius portion 56 is provided at the intersection of the rake surface 52 and connecting surface 54.

A treatment for improving cutting and wear characteristics may be applied to the front of the cutting blade blank, especially to at least rake surface 52. Such a treatment being, for example, a metallurgical treatment comprising a coating of a wear enhancing substance such as titanium nitride (TiN). Since only the side profile surfaces of profile-sharpened blades are ground during sharpening, the front surface 52 and any coating thereon are preserved throughout any number of sharpening procedures.

Figure 9:
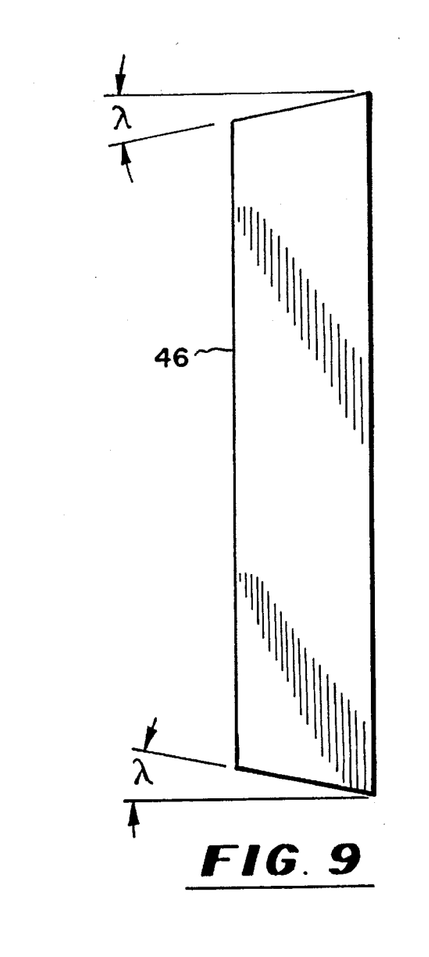
FIG. 9 represents a side view of an alternative cutting blade blank of the present invention.

FIG. 9 shows a modification of FIG. 7 wherein the cutting blade blank 40 may include the end surfaces being relieved by an angle λ which may serve as a top relief angle for the cutting blade formed from the blade blank 40.

Figure 10:
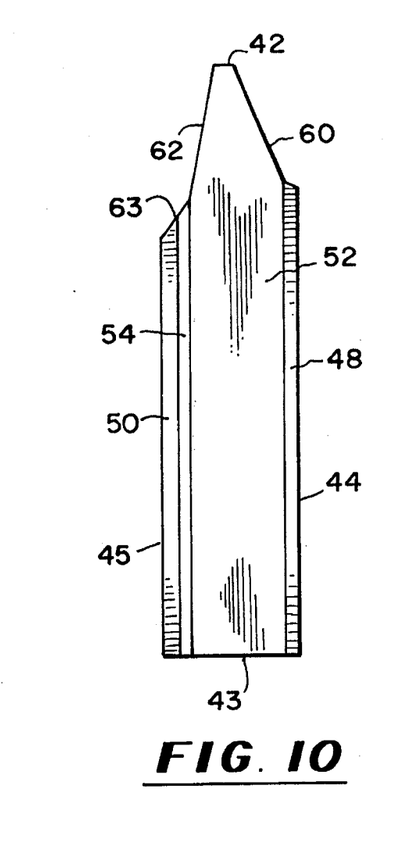
FIGS. 10 and 11 illustrate both inside and outside blades for the same direction of cutter rotation formed from a single cutting blade blank according to the present invention.

Since the cross-section of the blade blank 40 is uniform along its length, the blade blank of the present invention is in fact a universal cutting blade blank in that cutting blades may be formed from the blade blank 40 for cutting either inside or outside tooth flanks regardless of the direction of cutter rotation. For example, FIG. 10 shows a cutting blade formed from the blank shown in FIG. 7 with end 42 being the end where cutting edge 60 and clearance edges 62 will be formed. This cutting blade can function as an outside blade in clockwise rotating cutters or as an inside blade in counter-clockwise rotating cutters.

Figure 11:
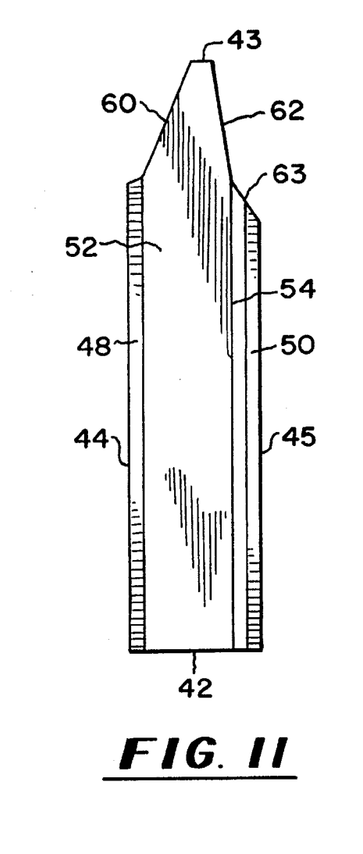

However, instead of the need for a "mirror-image" blade blank from which to form outside blades for counter-clockwise rotating cutters or inside blades for clockwise rotating cutters, the blade blank 40 of the present invention can be rotated end-for-end (180 degrees) to orient the blade blank such that these blades may be formed. FIG. 11 illustrates a cutting blade with end 43 of blade blank 40 (FIG. 7) being the end at which the cutting edge 60 and clearance edge 62 are formed. It can therefore be seen that by simply selecting the appropriate end of the present inventive cutting blade blank, all cutting blades can be formed from a single blade blank regardless of the tooth flank to be cut or the direction of rotation of the cutter.

Figure 12:
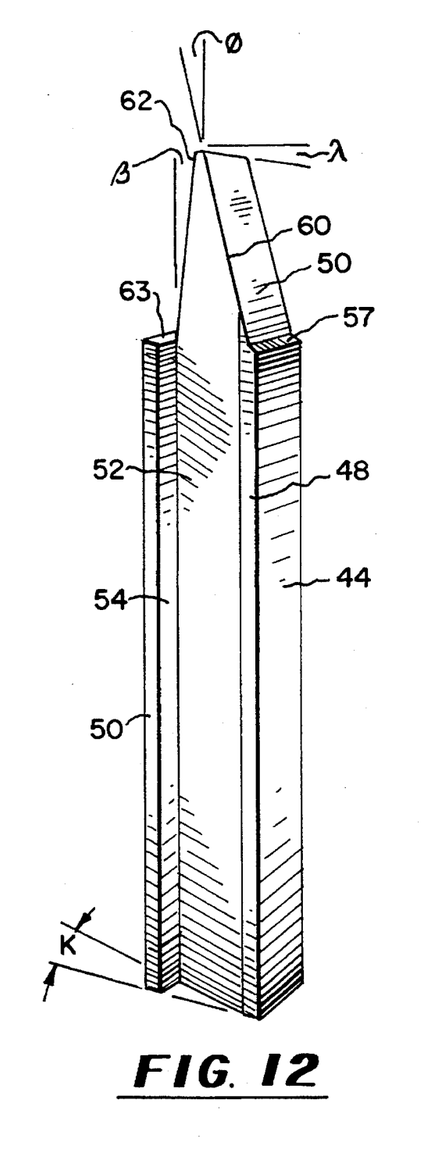
FIGS. 12 and 13 illustrate, respectively, an isometric view and top view of a cutting blade according to the present invention.
Figure 13:
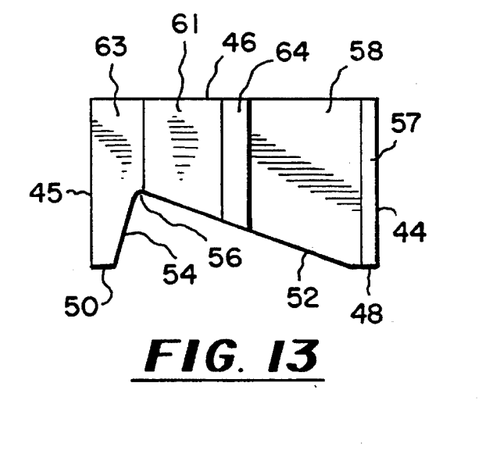

FIGS. 12 and 13 show a cutting blade formed from the blank of FIG. 7. The cutting blade comprises shoulder 57, pressure side surface 58, clearance side surface 61, shoulder 63 and top surface 64. It is to be understood that the term "top surface" is being used for convenience purposes only and is not intended to indicate a particular orientation of the cutting blade. The front of the cutting blade includes mounting surfaces 48 and 50 extending the length of the cutting blade up to their intersection with cutting edge 60 and clearance edge 62 respectively. Mounting surfaces 48 and 50 are located adjacent respective side surfaces 44 and 45 and with these side surfaces form front corners on the cutting blade. Located between mounting surfaces 48 and 50 are rake surface 52, oriented at rake angle K (which is usually about 10 degrees to about 30 degrees) with respect to the mounting surfaces, and connecting surface 54.

Preferably, end surface 50 and connecting surface 54 end at shoulder 63 and do not intersect clearance edge 62. In other words, it is preferred that the clearance edge 62 terminate at its intersection with the radiused portion 56. This provides sufficient clearance between the cutting region of the blade and the groove in the front of the blade such that chip packing in the groove is minimized and any chips which may pack in the groove will not interfere with the cutting process.

Rake surface 52 extends, at rake angle K, from first mounting surface 48 generally toward second mounting surface 50 such that a rake surface relieved away from the cutting edge 60 is formed on the cutting blade. Connecting surface 54 extends from mounting surface 50 generally toward back surface 46 to intersect with rake surface 52 and is oriented at an angle α with respect to mounting surface 50. Angle α is preferably no greater than about ninety (90) degrees since angles in excess of about ninety degrees result in the distance between side surface 45 and radius portion 56 being significantly less than the width of mounting surface 50 which is structurally undesirable. Preferably, rake surface 52 and connecting surface 54 are substantially perpendicular to one another although the present invention is not limited thereto. The orientation of connecting surface 54 preferably is such that regardless of the rake angle K, surfaces 52 and 54 are substantially perpendicular.

Figure 14:
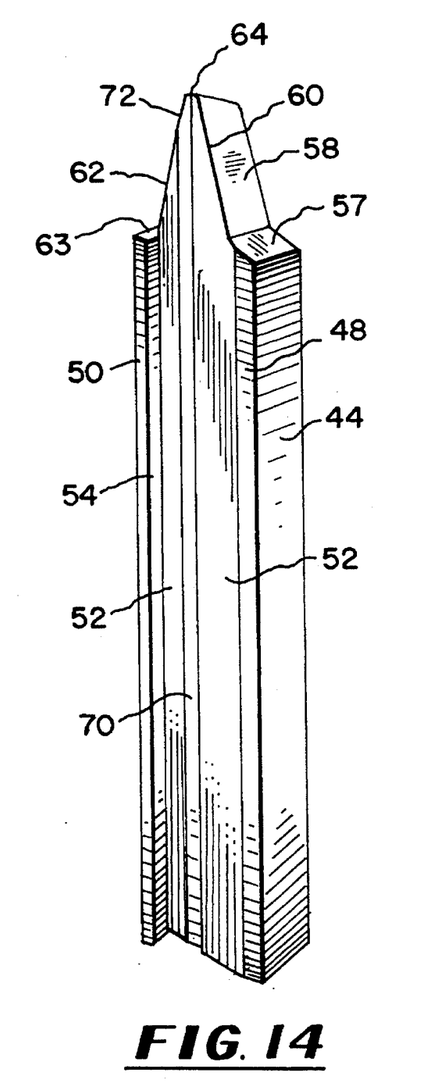
FIGS. 14 and 15 illustrate, respectively, an isometric view and top view of another cutting blade in accordance with the present invention.
Figure 15:
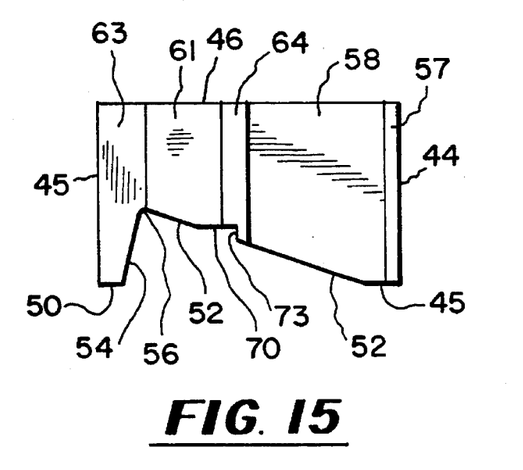

FIGS. 14 and 15 show a blade similar to that of FIG. 12 except for the inclusion of an additional narrow planar surface 70 extending the length of the cutting blade. Surface 70 is usually oriented parallel to back surface 46 but may vary up to about 10 degrees therefrom. However, in any case, the rake angle of surface 70 is different from that of rake surface 52. At the intersection of surface 70 with clearance side surface 61, a secondary cutting edge 72 is formed for cutting a portion of the bottom surface of a tooth as well as a portion of the tooth flank opposite that cut by cutting edge 60. A chip breaking surface 73 is formed between surfaces 52 and 70.

Figure 16:
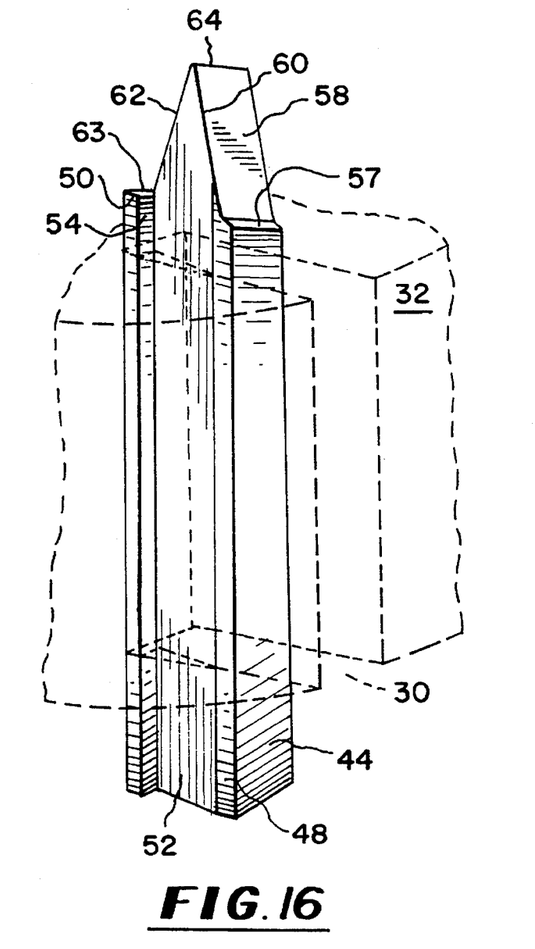
FIGS. 16 and 17 show, respectively, the cutting blade of FIG. 12 positioned in the slot of a cutter head and as viewed in the slot from the surface of the cutter head.
Figure 17:
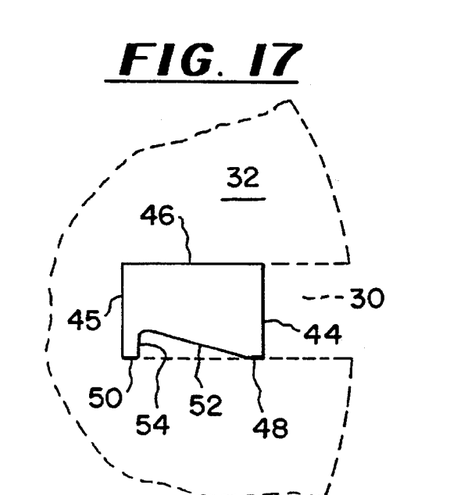

FIGS. 16 and 17 show a cutting blade according to the present invention positioned in a slot 30 of a cutter head 32. It can be seen that with front mounting surfaces 48 and 50, the cutting blade is supported at all four corners along its entire length of contact with the surface of the cutter head slot 30. Comparing FIG. 17 with FIG. 6, the gap 34 present in the cutter head due to the conventional cutting blade is nonexistent with the present inventive cutting blade. The cutting blade is supported at all four corners thus preventing any twisting heretofore experienced because of the presence of the gap 34. Each blade is clamped in place in a slot by clamping devices (not illustrated) well known in the art. Such clamping devices are shown, for example, in previously discussed U.S. Pat. No. 4,621,954.

Even as the cutting blade is moved up axially in the cutter head slot 30 as is necessitated by its decreasing length due to sharpening, the uniform cross-section of the cutting blade will afford continued four-corner support to prevent twisting regardless of the axial position of the blade. The cutting blades of the present invention may be sharpened on machines known in the art for restoring the surfaces of "profile-sharpened" cutting blades. Examples of such machines are shown in U.S. Pat. No. 4,144,678 to Ellwanger et al. and U.S. Pat. No. 5,168,661 to Pedersen et al.

In the preferred method of producing the cutting blade blank of the present invention, a piece of bar stock material, such as M2 or ASP23 steel is cut to a desired length for a cutting blade, for example about 4 inches (102 mm). The rake surface 52 and connecting surface 54 are then formed by machining a groove in the front surface of the blade blank. In the machining, preferably a milling process, a tool is traversed along the length of the blade blank to simultaneously form the rake surface 52 and the connecting surface 54 while leaving enough stock material on either side of the groove width, at the corners of the front surface, to function as the mounting surfaces 48 and 50. The width of the mounting surfaces is generally about 0.030 inch (0.762 mm) at a minimum with the maximum size depending upon the size of the cutting blade and/or the size capacity of the cutter head slot.

If desired, an additional narrow surface 70 (FIGS. 14 and 15) having a width of about 0.080 inch (about 2 mm) may be formed, preferably by milling, into the rake surface and extending along the entire length of the blade blank.

At least one, and preferably both, of the end surfaces 42 and 43 of the blade blank may then be relieved by cutting or grinding to a desired angle, usually about 3 to about 25 degrees, from the front of the blank toward back surface 46. The blade blank may then hardened by heat treating and finally the sides 44 and 45, back surface 46, mounting surfaces 48 and 50, and rake surface 52 may undergo a final grinding to the desired dimensions. Preferably, a wear resistant coating, for example, TiN, may be applied to at least rake surface 52 and, if present, additional narrow surface 70.

Alternatively, a hardened length of bar stock material may be provided and the front rake surface 52, connecting surface 54, mounting surfaces 48 and 50 may be formed in the front surface of the hardened bar stock.

In the production of the cutting blade, a cutting blade blank is rough ground at the appropriate end to substantially from the desired pressure, top, and clearance surfaces and then those surfaces are finish ground to the desired specifications. The pressure angle φ of the cutting edge 60 is generally about 8 to about 40 degrees with respect to the side surface and clearance edge 62 is oriented at clearance angle β, generally about 0 to about 35 degrees, with respect to a side surface.

The present invention overcomes the need for mirror-image cutting blade blanks in order to provide cutting blades capable of cutting inside and outside tooth flanks. The uniform cross-section of the blade blank of the present invention provides a truly universal cutting blade blank whereby inside or outside cutting blades may be formed for left-hand rotation or right-hand rotation cutters by selecting the appropriate end of the cutting blade blank for forming the desired cutting and clearance surfaces.

The present invention further provides a significantly more stable cutting blade in that it provides for support at all four corners of the cutting blade when mounted in a cutter head. The presence of a pair of front mounting surfaces eliminates the previous encountered twisting of the cutting blade due to a lack of support at the front, clearance-side region of the cutting blade.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of forming an inside cutting blade or an outside cutting blade for a cutter to be rotated in either a right-hand direction or a left-hand direction, said inside blade or said outside blade being formed from the same cutting blade blank, said method comprising:

providing a cutting blade blank comprising a uniform cross-section along its length, said blade blank including opposite ends with each of said ends having an end surface, said blade blank further including a pair of opposed side surfaces, a back surface, a front surface having first and second mounting surfaces, a front rake surface, and a connecting surface, said first mounting surface being located adjacent one of said opposed side surfaces and defining a corner of said blade blank with said one side surface, said second mounting surface being located adjacent the other of said opposed side surfaces and defining another corner of said blade blank with said other side surface, said front rake surface extending from said first mounting surface generally toward said second mounting surface and being oriented at a rake angle with respect to said mounting surfaces, said connecting surface extending from said second mounting surface generally toward said back surface and intersecting with said front rake surface, determining the direction of cutter rotation, choosing one of said inside blade and said outside blade for said determined direction of cutter rotation, the chosen inside or outside blade to be formed from said same cutting blade blank, selecting one of said opposed ends corresponding to the chosen inside or outside blade wherein a cutting surface is to be formed adjacent said rake surface and a clearance surface is to be formed adjacent said connecting surface, removing stock material from the selected end to produce said cutting surface, said clearance surface, and a top surface.

2. The method of claim 1 wherein said connecting surface and said rake surface are substantially perpendicular with respect to one another.

3. The method of claim 1 wherein at least one of said end surfaces are relieved in a direction from said front surface toward said back surface.

4. The method of claim 1 wherein said front surface further includes an additional narrow planar surface extending along the length of said blank, said surface being oriented at a rake angle differing from the rake angle of said rake surface.

5. The method of claim 1 wherein said connecting surface is oriented at an angle of no greater than about ninety degrees with respect to said second mounting surface.

6. The method of claim 1 wherein the selected end is an end whereby an inside cutting blade for a right-hand rotating cutter or an outside cutting blade for a left-hand rotating cutter is formed.

7. The method of claim 1 wherein the selected end is an end whereby an inside cutting blade for a left-hand rotating cutter or an outside cutting blade for a right-hand rotating cutter is formed by said method.

8. A method of forming an inside cutting blade or an outside cutting blade for a cutter to be rotated in either a right-hand direction or a left-hand direction, said inside blade or said outside blade being formed from the same cutting blade blank, said method comprising:

providing a cutting blade blank comprising a uniform cross-section along its length, said blade blank including opposite ends with each of said ends having an end surface, said blade blank further including a pair of opposed side surfaces, a back surface, a front surface having first and second mounting surfaces, a front rake surface, and a connecting surface, at least one of said end surfaces being relieved in a direction from said front surface toward said back surface, said first mounting surface being located adjacent one of said opposed side surfaces and defining a corner of said blade blank with said one side surface, said second mounting surface being located adjacent the other of said opposed side surfaces and defining another corner of said blade blank with said other side surface, said front rake surface extending from said first mounting surface generally toward said second mounting surface and being oriented at a rake angle with respect to said mounting surfaces, said connecting surface extending from said second mounting surface generally toward said back surface and intersecting with said front rake surface, determining the direction of cutter rotation, choosing one of said inside blade and said outside blade for said determined direction of cutter rotation, the chosen inside or outside blade to be formed from said same cutting blade blank, selecting one of said opposed ends corresponding to the chosen inside or outside blade whereby a cutting surface is to be formed adjacent said rake surface and a clearance surface is to be formed adjacent said connecting surface, removing stock material from the selected end to produce said cutting surface, said clearance surface, and a top surface.

9. The method of claim 8 wherein said connecting surface and said front rake surface are substantially perpendicular with respect to one another.

10. The method of claim 8 wherein said front surface further includes an additional narrow planar surface in said front rake surface and extending along the length of said blade, said additional surface being oriented at a rake angle differing from the rake angle of said front rake surface.

11. The method of claim 8 wherein said connecting surface is oriented at an angle of no greater than about ninety degrees with respect to said second mounting surface.

12. The method of claim 8 wherein the selected end is an end whereby an inside cutting blade for a right-hand rotating cutter or an outside cutting blade for a left-hand rotating cutter is formed.

13. The method of claim 8 wherein the selected end is an end whereby an inside cutting blade for a left-hand rotating cutter or an outside cutting blade for a right-hand rotating cutter is formed by said method.

* * * * *